July 24, 1928.
A. V. HARTMANN
1,678,289
VARIABLE SPEED GEARING
Filed March 8, 1927
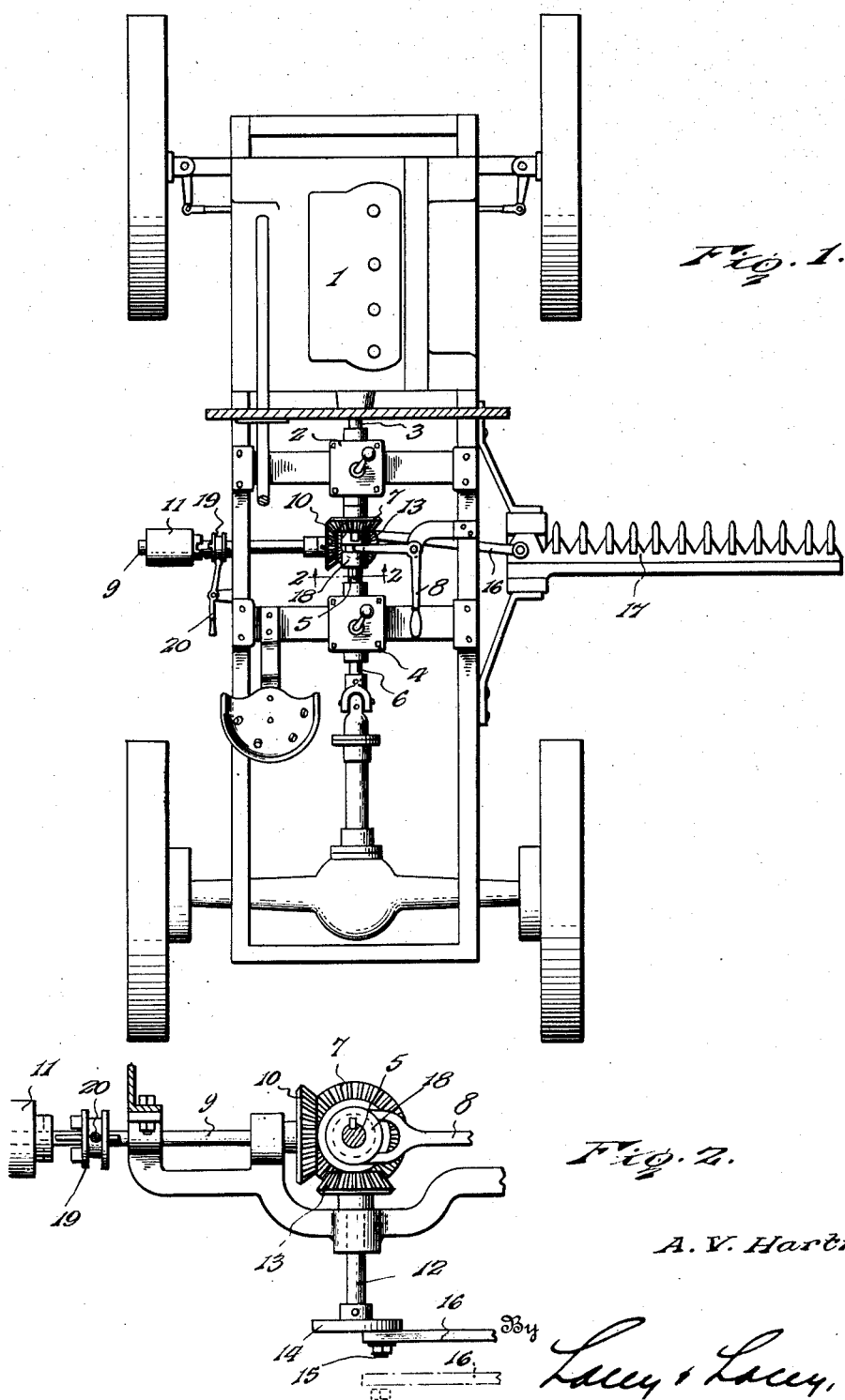

Patented July 24, 1928.

1,678,289

UNITED STATES PATENT OFFICE.

ANTON V. HARTMANN, OF ST. PAUL, MINNESOTA, ASSIGNOR OF ONE-HALF TO VICTOR H. STEVENS, OF ST. PAUL, MINNESOTA.

VARIABLE-SPEED GEARING.

Application filed March 8, 1927. Serial No. 173,705.

Specifically considered the invention relates to farming machinery and provides motive power whereby an implement may be propelled over the ground and at the same time perform work, or may be utilized as a stationary engine for driving milling or other machinery.

The invention furthermore relates to a variable speed power take-off located between two transmissions, whereby operation of the transmission on the engine side of the take-off controls both the speed of the apparatus or part to be driven and the speed of the vehicle, and operation of the transmission on the opposite side of the take-off and connected with the running gear of the vehicle controls the speed of the vehicle without changing the speed of the apparatus or part to be driven. As a result the speed of the vehicle may be varied without changing the speed of the apparatus or part to be driven.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a top plan view of the chassis of a motor vehicle, embodying the invention.

Figure 2 is an enlarged detail view on the line 2—2 of Figure 1.

Corresponding and like parts are referred to in the following description and designated in both views of the drawings by like reference characters.

The chassis illustrated is substantially of the general construction provided for motor vehicles, and is illustrated to demonstrate the application of the invention. The numeral 1 designates the engine which may be of any make or design, generally employed as the power unit of a motor vehicle. The numeral 2 designates the usual transmission associated with the shaft 3 of the motor. The numeral 4 designates a second transmission which is spaced from the transmission 2 and which is associated with the shaft 5 extending from the transmission 2. The numeral 6 designates the drive shaft interposed between the transmission 4 and the differential of the rear axle.

In accordance with the invention a bevel gear wheel 7 is loose upon the shaft 5 and is adapted to be secured thereto by means of a clutch member 18 splined to the shaft 5 and movable thereon by means of a shifting lever 8 having a fork to engage a groove formed in the clutch member. A shaft 9 is disposed transversely of the chassis and mounted in suitable bearings. A bevel gear wheel 10, fast to the inner end of the shaft 9 is adapted to mesh with the teeth of the gear wheel 7. A pulley 11 loose upon the outer end of the shaft 9 is adapted to receive a drive belt, not shown, whereby to operate any machinery to be driven. A clutch member 19 splined upon the shaft 9 is adapted to engage the pulley 11 and cause it to rotate with the shaft 9. A lever 20 mounted upon the chassis engages the clutch member 19 and provides means for shifting it to cause the pulley and shaft to rotate in unison when required. A vertical shaft 12 suitably mounted upon the chassis is provided at its upper end with a bevel gear wheel 13 which is fast thereto and adapted to coact with the gear wheel 7. A disk 14 is fast to the lower end of the vertical shaft 12 and is provided with a crank pin 15. A pitman 16 forms connecting means between the crank pin 15 and the cutter bar 17 of a mowing mechanism. When the cutting mechanism is in operation the pitman 16 is connected to the pin 15, as shown by the full lines in Figure 2. When the pitman is disconnected as shown by the dotted lines in Figure 2, the cutting mechanism is inactive.

When the transmission 2 is in neutral and the motor 1 is running the machine is at rest and no movement is imparted to the shafts 9 and 12. Upon operating the lever 8 to throw the clutch member 18 in engagement with the gear wheel 7 the latter rotates with the shaft 5 and operates the gear wheels 10 and 13. Upon throwing the transmisison 4 into gear it will be understood that the machine may be propelled at the required speed. When both transmissions 2 and 4 are in gear and the clutch member 18 is moved to release the gear wheel 7 the machine may be propelled without any movement being imparted to either of the shafts 9 and 12. It will thus be understood that the machine may be utilized in the capacity of a stationary engine for operating any machinery to be driven, or may be propelled over the field and at the same time operate any mechanism to be driven, such as a cutting mechanism, a planting mechanism, or the like. When moving the machine from place to place the shafts 9 and 12 are thrown out of gear by shifting the clutch member 18 to release the gear wheel 7.

Having thus described the invention, I claim:

In a machine mounted upon wheels and including a motor and drive shaft, separate and independent transmissions in the length of the drive shaft, a gear wheel loose on the drive shaft, a clutch member for connecting the loose gear wheel to the drive shaft, other shafts geared to the said loose gear wheel, a pulley loose on one of the last mentioned shafts, a clutch member for connecting the pulley to its shaft, and an operating mechanism detachably connected with the other one of the last mentioned shafts.

In testimony whereof I affix my signature.

ANTON V. HARTMANN. [L. S.]